Aug. 9, 1966  S. SOENNICHSEN  3,264,955
EGG CARTON SETUP MACHINE
Filed Aug. 22, 1963  8 Sheets-Sheet 1
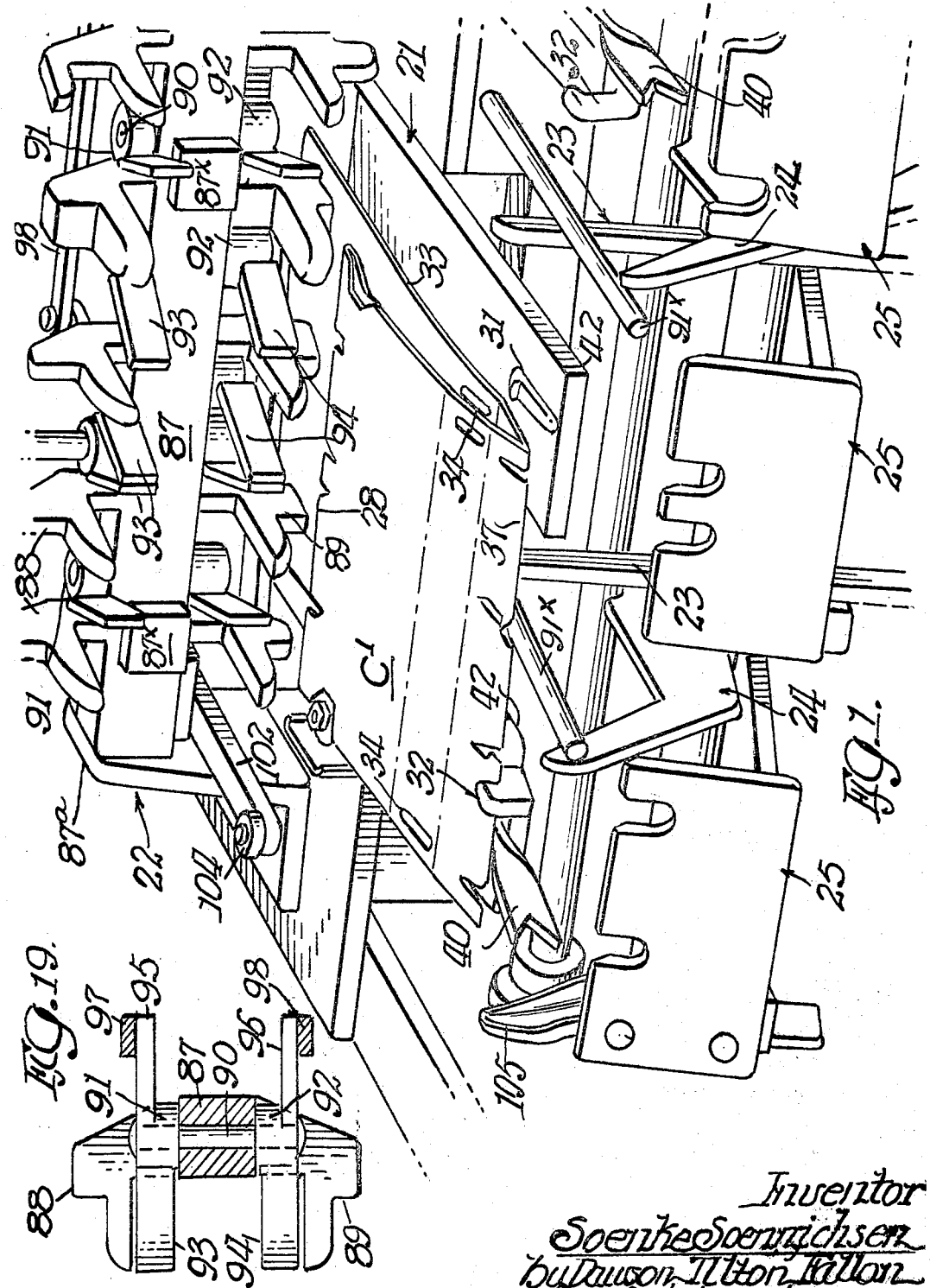
Inventor
Soenke Soennichsen
by Dawson, Tilton, Fallon
Lungmus & Alexander Attys

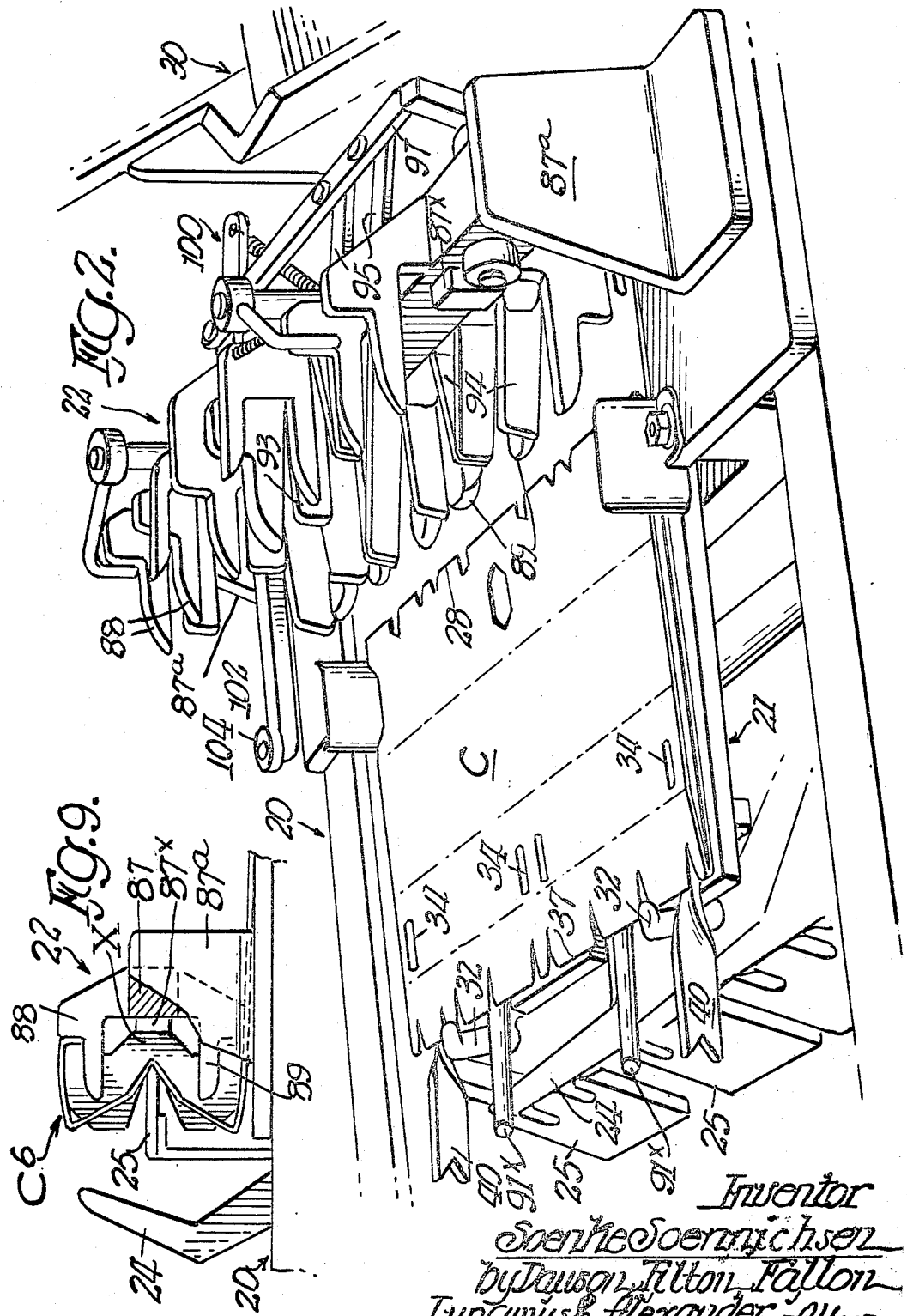

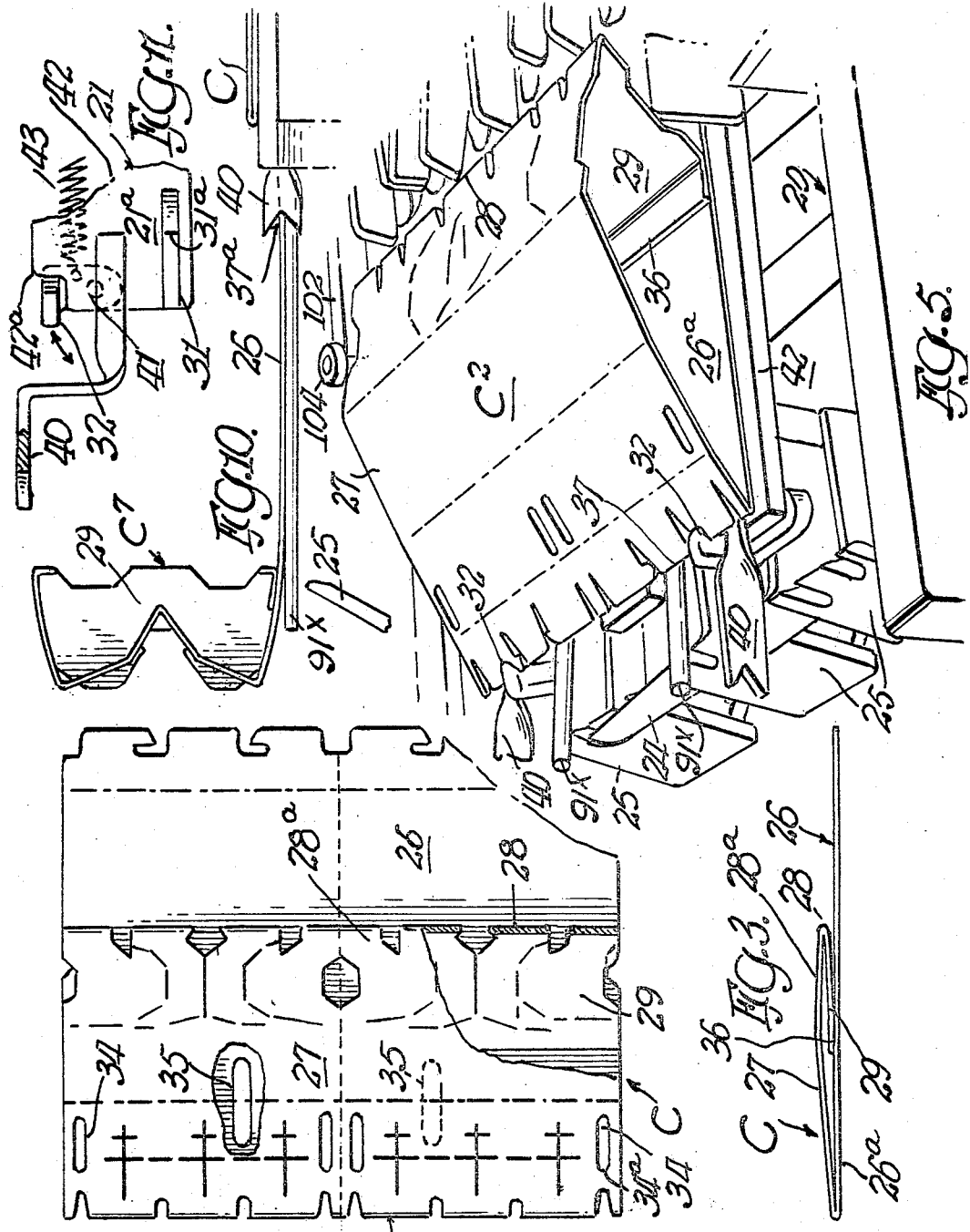

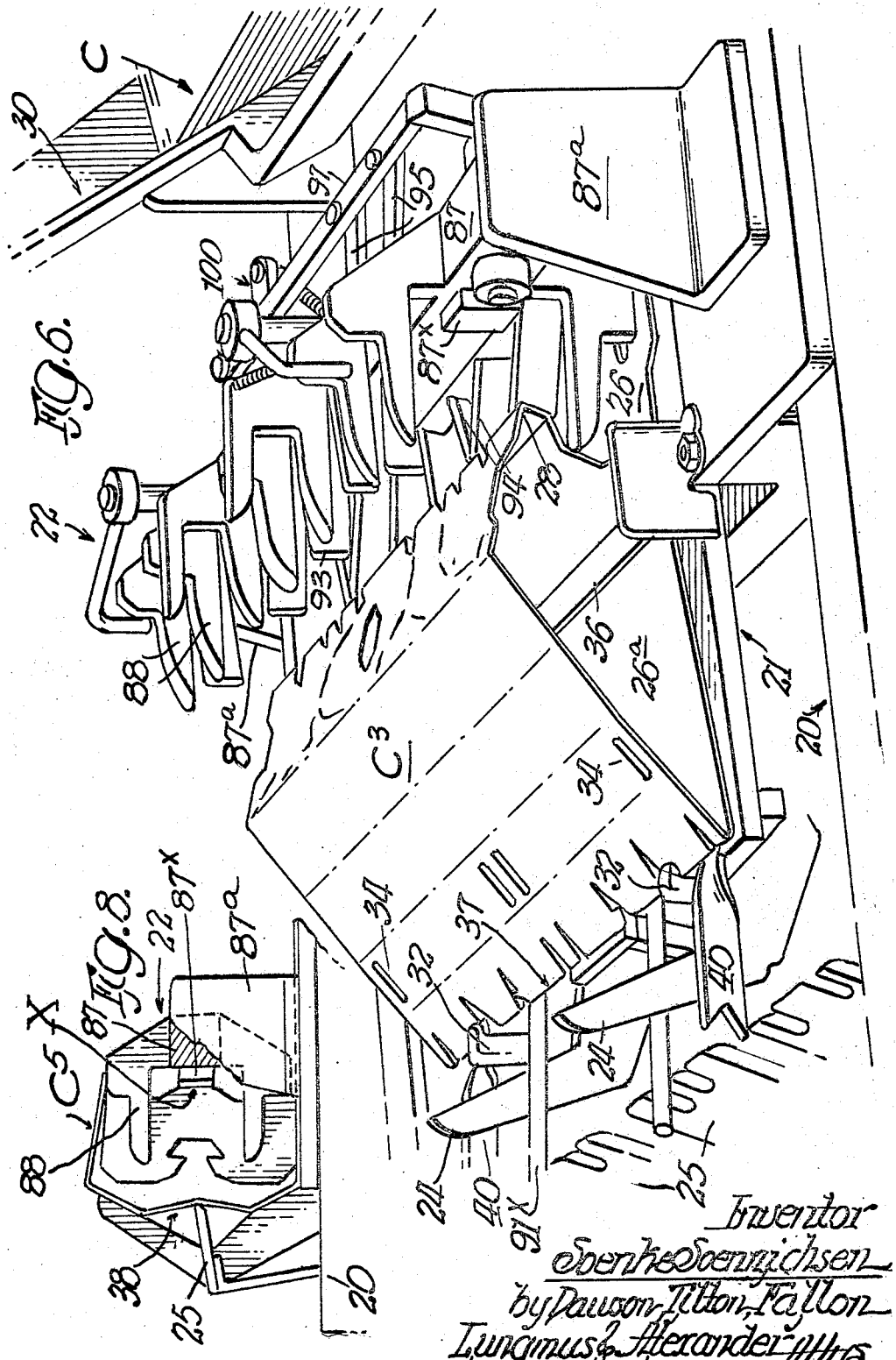

Inventor
Soenke Soennichsen
by Dawson, Tilton, Fallon
Lungmus & Alexander, Attys

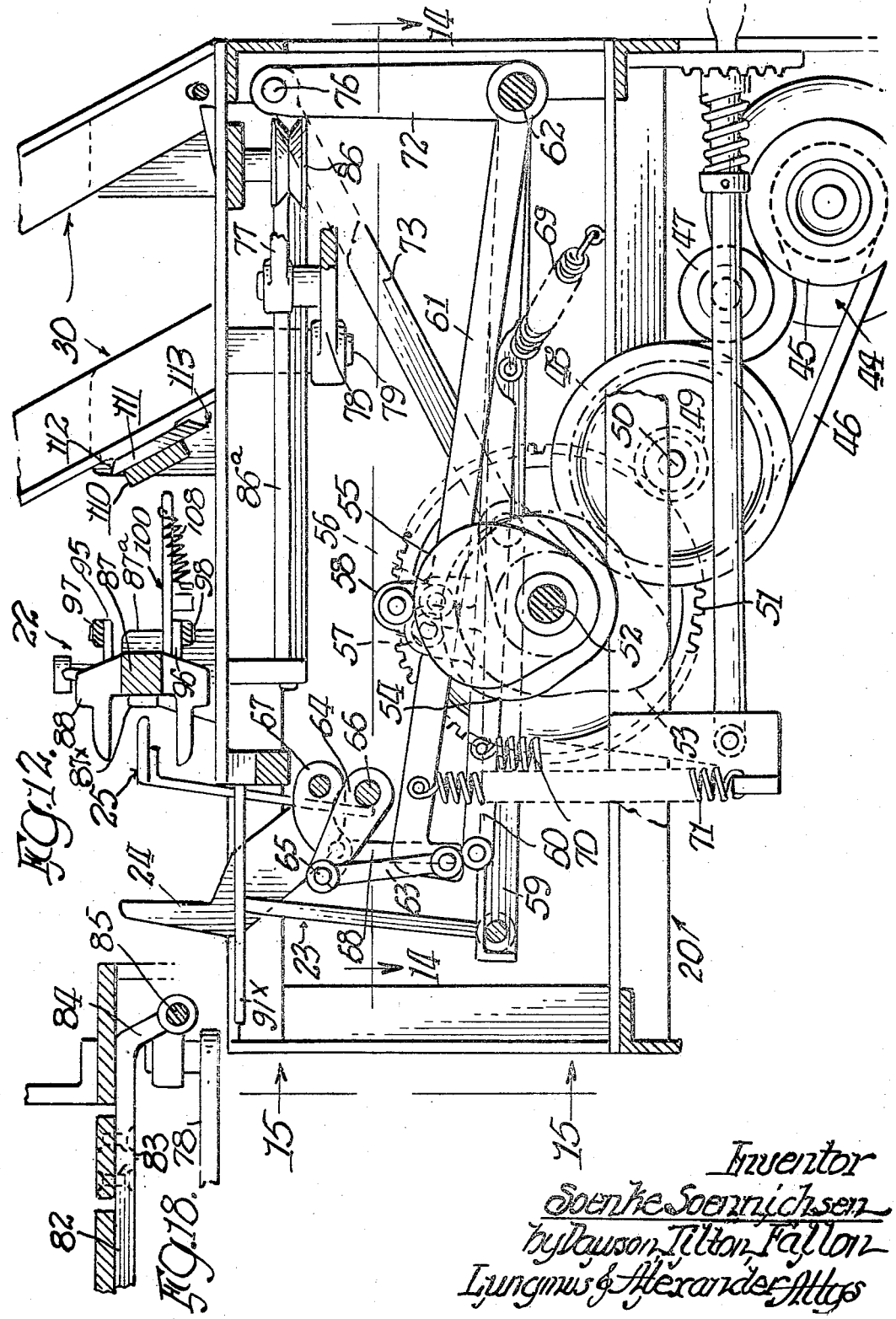

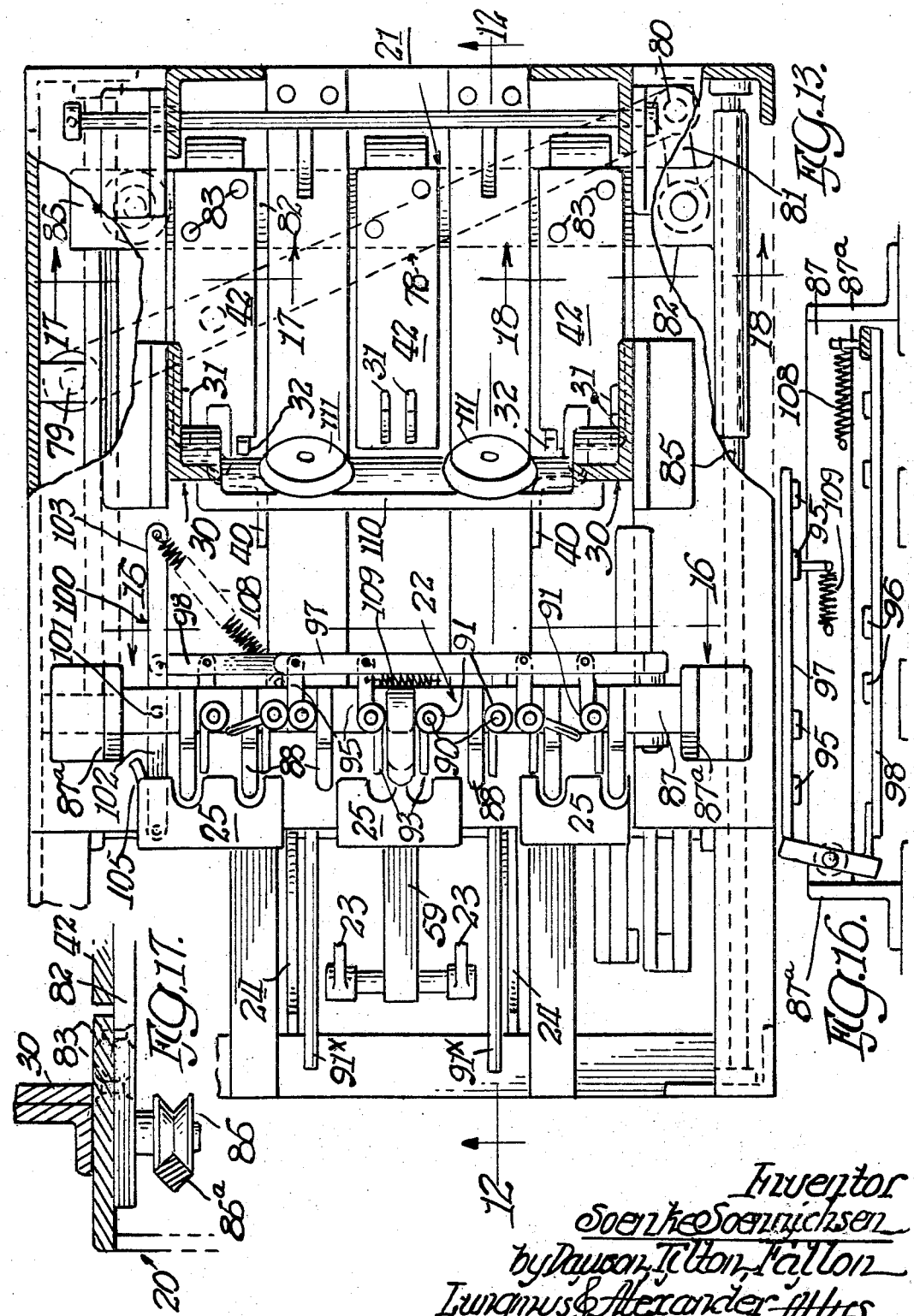

ng the lines 17—17 and 18—18, respectively, as applied to FIG. 13; and

FIG. 19 is a view of the mounting for the tucker fingers.

In the illustration given and referring to FIG. 1, the numeral 20 designates generally the frame of the machine which is equipped with a movable shuttle 21. The shuttle is arranged to move in a horizontal reciprocatory fashion under a stationary setup head generally designated 22. Other principal operating parts include forks generally designated 23, pushers generally designated 24, and clinchers generally designated 25. The function of these various parts can be readily appreciated from the generalized discussion of the operating procedure as set down immediately below and with reference to FIGS. 1–10, which depict the successive steps in setting up an egg carton.

The egg carton in question can be seen in FIGS. 3 and 4 where the same is designated by the symbol C. The carton C, in the blank form illustrated in FIGS. 3 and 4, has a lower wall 26 and an upper wall 27 folded as at 28 to provide an included wall portion 29. Eventually the carton of FIG. 16 is developed wherein the lower wall portion 26a is employed to form part of the bottom wall of the three-dimensional carton, the portions 28a and 29 providing cell-defining partitions.

The carton C is seen in FIG. 2 to be in its unexpanded condition after having been advanced by the shuttle 21 from a magazine generally designated 30 and provided as part of the frame 20. In arriving at the condition shown, the carton C has passed under the stationary head 22 and is fixed in place by the cooperation of the hook lugs 31 (see FIG. 1) and the clamping latches 32 provided as part of the shuttle 21. In FIG. 1, it will be appreciated that the carton $C_1$ is partially broken away as at 33 to reveal the lug 31 and that the latch 32 associated with the right-hand portion of the shuttle 21 has been omitted for the sake of clarity of presentation. In the condition seen in FIG. 2, the lugs 31 engage the elongated, aligned openings 34 provided in the carton blank C, and the leading edge of the blank is engaged by the latches 32. This stabilizing structure will be described in greater detail later and with respect to an enlarged fragmentary showing in FIG. 11.

When the carton C has reached the condition shown in FIG. 2, the forks 23 are actuated to elevate the upper wall 27—this being achieved by the forks 23 passing through suitable openings 35 in the lower wall 26. The start of the elevation of the upper wall 27 is seen in FIG. 1 and a subsequent stage of elevation of the wall 27 is depicted in FIG. 5, where the carton is designated $C_2$. During this operation, the forks 23 extend through openings 35 (see FIG. 4) to abut the underside of the top wall 27, the top wall 27 in the intermediately positioned portion 29 being adhesively secured to the bottom wall 26 as at 36 (see FIG. 3). At this stage, the latches 32 are still in engagement with the leading edge of the carton C, while the openings 37 of the carton blank are still engaged by the hook-like lugs 31.

Following the condition of the apparatus and blank in FIG. 5, the pushers 24 are brought into operation, and this is reflected in FIG. 6, where the carton configuration has been designated $C_3$. At this time, the forks 23 have completed the expanding operation and the pushers 24 are moving to the right in FIG. 6 to engage the leading edge 37 of the carton blank. FIG. 6 also differs from FIG. 5 in that the reciprocating shuttle 21 has moved slightly to the right, i.e., after the end of its travel, slightly backwards toward the magazine 30. In FIG. 6, it is also seen that the latches 32 are still in engagement with the leading edge 37 of the blank designated $C_3$.

United States Patent Office 3,264,955
Patented August 9, 1966

3,264,955
EGG CARTON SETUP MACHINE
Soenke Soennichsen, Chicago, Ill., assignor to Premier Tool Works, Inc., Chicago, Ill., a corporation of Illinois
Filed Aug. 22, 1963, Ser. No. 303,842
6 Claims. (Cl. 93—37)

This invention relates to an egg carton setup machine, and, more particularly, to a novel machine utilizing a stationary head.

The egg cartons with which the invention is concerned are generally in the form of blanks as seen in U.S. Patent 1,783,397. These are "setup," i.e., developed into a three-dimensional configuration, at the site of filling, and machines for this purpose have been available for many years. The complexity of the carton has demanded like complexity in the machinery, with many moving parts. The set up head or cell-former heretofore has always been movable in conjunction with other moving parts, and has imposed a distinct limitation on production.

It is, therefore, an object of this invention to provide a novel egg carton setup machine which avoids this problem through making use of a stationary head.

More specifically, it is an object to provide a novel shuttle in an egg carton setup machine which makes possible the elimination of head movement.

Other objects and advantages of the invention may be seen in the details of construction and operation set down in this specification.

The invention is explained in conjunction with an illustrative embodiment in the accompanying drawing, in which—

FIG. 1 is a fragmentary perspective view of the inventive machine and showing a fragmentary part of the carton blank so as to illustrate the initial step of opening the blank by raising the upper section thereof;

FIG. 2 is a fragmentary perspective view of the machine in the condition just prior to that of FIG. 1, i.e., after a flat, folded blank has been fed into an initial operating position with respect to the setup mechanism of the machine;

FIG. 3 is an end elevational view of the blank appearing in FIGS. 1 and 2;

FIG. 4 is a plan elevational view of the flat folded carton blank;

FIG. 5 is a fragmentary perspective view of the machine showing the carton blank in the stage following that of FIG. 1;

FIGS. 6 and 7 are also fragmentary perspective views of the machine in successive operating conditions to that shown in FIG. 5;

FIG. 8 is a view in elevation of certain parts of the setup mechanism of the machine, better illustrating the step of the setting up operation following the step which appears in FIG. 7;

FIGS. 9 and 10 are fragmentary perspective views illustrating further successive steps in the setup operation;

FIG. 11 is a fragmentary elevational view, partially in section, of the front end of one of the shuttle bars associated with the inventive machine;

FIG. 12 is a fragmentary longitudinal vertical sectional view of the machine such as would be seen along the sight line 12—12 of FIG. 13;

FIG. 13 is a top plan view of the inventive machine;

FIG. 16 is a sectional view taken along the line 16—16 of FIG. 13;

FIGS. 17 and 18 are fragmentary sectional views taken

Figure 7:
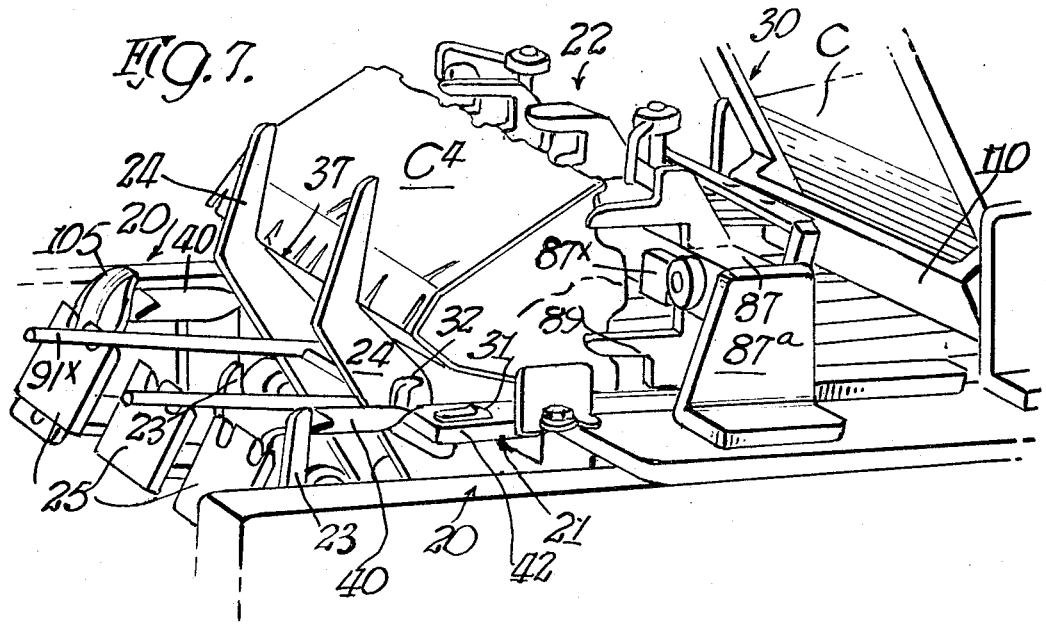

Referring now to FIG. 7, it is seen that the pushers 24 are now in engagement with the leading edge 37 of carton $C_4$—the angled or L-shaped pushers 24 having detached the leading edge 37 from under the clamping latches 32. Following the operation seen in FIG. 7, the carton $C_5$ is seen in FIG. 8 in the condition of being indented as at 38 by the clinchers 25, the clinchers 25 being seen in their normally retracted position in FIG. 7.

A further stage in the development of the carton is seen in FIG. 9, wherein the carton is designated $C_6$, and here the clinchers 25 are seen in the position of completely indenting the portion of the carton which ultimately becomes the base wall of the three-dimensional carton, the clinchers 25 operating against the stationary head 22. The head 22 is equipped with a plurality of cell-forming members as seen in FIG. 1 but which will be described hereinafter.

A final step in the setup operation is seen in FIG. 10 wherein the carton is designated $C_7$ and wherein the trailing edge 37a of the lower wall 26 is being engaged by a fishtail ejector 40 (see also FIG. 11) so as to eject the carton $C_7$ and permit the advancement of a new carton $C'$.

In summary, the carton blank is advanced with the shuttle 21 and is immobilized in place thereon by means of the hook-like lugs 31 and spring-loaded latches 32 not only during the forward movement of the shuttle but also for a portion of the rearward movement and until the partially unfolded carton is about in engagement with the stationary head 22. Following the partial unfolding of the carton by means of the forks 23, the pushers 24 operate to disengage the forward wall 37 of the carton $C_4$ from under the latches 32, the latches 32 pivoting forwardly (in the direction of discharge) so as to preclude any scissors-like action which would be injurious to the carton. The pushers maintain the carton in position for engagement by the clinchers 25 which serve to indent the bottom wall of the carton while the cell-forming members 39 develop the necessary folds in the carton for the ultimate receipt of eggs.

The hook-like lugs 31 can be appreciated best from a consideration of FIGS. 1 and 11. It will be seen that the lugs 31 upstand from the flat surface 21a of the shuttle 21. Each lug 31 is positioned adjacent the forward end (in the direction of setup carton discharge) of the shuttle 21 and the lug 31 is further characterized by having an intermediate hook surface 31a. The hook surface 31a engages a forward edge 34a of the slot 34 (see FIG. 4) in removing a blank from the magazine 30. Each latch 32 is pivotally mounted as at 41 on the underside of its associated shuttle bar 42 and urged rearwardly through a horizontal arc as indicated by the arrow in FIG. 10 by means of the spring 43 interconnected between the latch 32 and its associated shuttle bar 42. The spring-loading of the latch 32 also permits the latch 32 to pivot slightly forwardly during the loading of the shuttle 21 from the magazine 30, the shuttle bar 42 being notched as at 42a to accommodate the latch 32.

The mechanism for actuating the various reciprocating and oscillating elements will now be described and in conjunction with FIGS. 12–18. Referring now to FIG. 12, it is seen that the frame 20 is equipped with a motor 44 providing a source of rotational power. The motor 44 is equipped with a drive sheave 45 which entrains a belt 46. The belt 46 is suitably tensioned by means of a tensioning pulley 47 and further engages a larger sheave 48. The sheave 48 is mounted in common with a spur gear 49 on a shaft 50 suitably journaled on the frame 20. Rotational power from the spur gear 49 is transmitted to the main gear 51 carried on the main cross shaft 52. Fixed to the cross shaft 52 are cams 53, 54 and 55 associated respectively with the forks 23, the pushers 24, and the clinchers 25. For this purpose, cam followers 56, 57 and 58 are provided (see FIG. 14).

Each cam follower 56–58 is carried by a cam follower arm 59, 60 and 61, respectively, all of which are mounted on a transverse shaft 62. Reference to FIG. 12 reveals that the cam follower arm 61 carrying cam follower 58 rides against the periphery of cam 55 and through links 63 and 64 actuates the clinchers 25. The links 62 and 64 are pivotally interconnected as at 65, and further the link 64 is pivoted at its other end as at 66 about a shaft fixed within frame 20.

In like fashion, the pushers 24 are interconnected with the cam follower 60 through links 67 and 68. Urging each of the cam follower arms 59–61 downwardly against the periphery of the respective cams 53–55 are springs 69, 70 and 71. The surfaces of the cams 53–55 are contoured so as to first raise the cam follower arm 59, thereby elevating the forks 23, thereafter elevating the cam follower arm 60 so as to pivot the pushers 24 into the FIG. 7 position, and finally to pivot the clinchers 25 into the FIG. 9 position.

The stationary pivot shaft 62 also provides a pivotal mounting for a lever arm 72 (see FIG. 12) which is moved back and forth by the connecting rod 73 (FIG. 14), the other end of the rod 73 being attached to the rotating crank 74 and thus converting rotary into linear motion for moving the shuttle 21. The crank 74 can be seen in FIG. 14, wherein it is fixed to the cross shaft 52, the cross shaft 52 being journaled in bearings 75 provided as part of the frame 20. The link 72 and crank 74 are interconnected as at 76 in FIG. 12, and provide a mounting for one end of a second connecting rod 77 for the purpose of multiplying this motion. The other end of the rod 77 is connected to the shuttle arm 78 at a point close enough to the stationary pivot point 79 (see FIG. 13) of the shuttle arm 78 to impart a large arc-like motion to the other end 80 of the shuttle arm 78. The end 80 is connected to a rod 78 (see FIG. 13) which in turn is connected to the crossbar 82, whereby the crossbar 82 is reciprocated over a large path. The crossbar 82 carries the various shuttle bars 42 by means of bolts 83. The crossbar 82, at the end connected to the shuttle arm 78, is equipped with a depending bracket portion 84 which is ensleeved about a stationary guide shaft 85 (see FIG. 18). Depending from the crossbar 82 is a roller assembly generally designated 86 (see FIG. 17) which engages the square guide 86a.

It will be seen that the cam 53 is so synchronized with the crank 74 as to elevate the forks 23 at the extreme forward limit of travel of the shuttle 21—the condition of the machine pictures in FIG. 12 being with the shuttle 21 fully retracted so as to receive another carton from the magazine 30, and in this condition the clinchers 25 are pivoted to their maximum rearward position so as to urge the unfolded carton into the cell-forming setup head 22. The cell-forming setup head 22, as a whole, is mounted on a stationary crossbar 87 which is square in cross section and in turn is supported at its ends in upright brackets 87a rising from the side rails of the main frame 20.

The crossbar 87 is provided along its top and bottom with a plurality of forwardly-extending abutments 88 and 89, respectively, and against which the cell-forming partitions are engaged, as best shown in FIG. 8 just before the clinchers 25 move the bottom-forming parts of the carton into the setup condition as appears in FIG. 9.

Journaled in the crossbar 87 in positions between the abutments 88 and 89 are vertically disposed studs 90, and turnable on the upper and lower ends of the studs 90 above and below the bar 87 are the hubs 91 and 92. Fixed to each hub 91 and 92 are forwardly projecting tucker fingers 93 and 94, respectively. In the turning movements of the hubs 91 and 92, the tucker fingers engage the partition portions of the blank to swing them toward the associated abutments 88 and 89 into partition-forming position.

To impart the rocking or turning movement to said hubs 91 and 92, each of these members is provided with a rearwardly-extending arm. The arms carried by the upper hubs 91 are indicated at 95, and the arms carried by the lower hubs 92 are indicated at 96.

The free rearward ends of the arms 95 are pivotally connected to an arcuate bar 97 and the like ends of the arms 96 are pivotally connected to the second actuator bar 98, as best appears in FIGS. 16 and 19, respectively.

It will be noted from FIGS. 13 and 16 that the lower bar 98 is below the upper bar 97 and that one end (the upper end in FIG. 13) is pivotally connected to the midportion of a lever 100 which in turn is pivoted at 101 (FIG. 13) to the underside of the crossbar 87. This arrangement provides forwardly and rearwardly-extending arms 102 and 103 for the lever. The arm 102 of the lever carries the roller 104 (see FIG. 2), which in the movement of the clinchers 25 toward clinching position is adapted to be engaged by a cam 105 carried by one of the clinchers and which best appears in FIG. 1. When the cam so engages the roller, it rocks lever 100, which in turn causes the bar 98 to move longitudinally downwardly when viewed in FIG. 13 and to the left when viewed in FIG. 16. Conventional means may be provided to impart a longitudinal movement to the bar 97 but in a direction opposite to that of its companion bar 98.

With the bars 97 and 98 thus moving in opposite directions, opposite directional swinging movements are imparted to the upper and lower sets of fingers 93 and 94. The spring 108 (see FIGS. 13 and 16) is fixed at one end to the arm 103 of the lever 100 and at its other end to the rear side of the crossbar 87 and biases the movement of the lever in opposition to the cam 105. Also, spring 109 is provided between the bars 97 and 87 (see FIGS. 13 and 16) to assist in the movement of the bars 97 and 98.

Following the condition of the machine as seen in FIG. 12, the shuttle 21 advances once again, and in so doing causes the fishtail members 40 to eject the now-completed carton in advance of the carton to be set up, this being illustrated in FIG. 10 wherein the completed carton is supported on fingers 91.

The carton blank magazine (see FIGS. 1 and 13) includes a rigid crossbar 110 and disposed (edgewise) at an upward and forward angle and eccentrically mounted on the rear face thereof is a pair of discs 111 each having beveled edges 113. These discs provide a throat 113 which allows only one carton blank at a time to be delivered from the magazine in the forward movement of the shuttle 21. By the eccentric mounting of the discs, the width of the throat may be adjusted to compensate for the difference in thickness of the carton blanks disposed as a pack or stack in the magazine.

Figure 15:
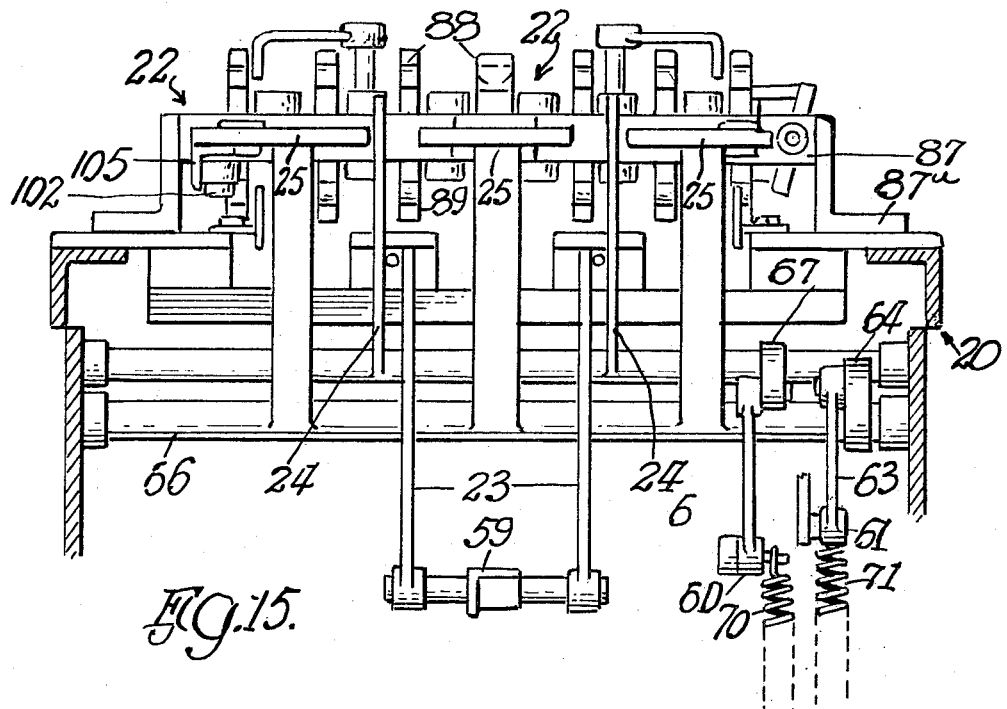
FIG. 15 is an end elevational view of the machine as seen along the sight line 15—15 applied to FIG. 12.
Figure 14:
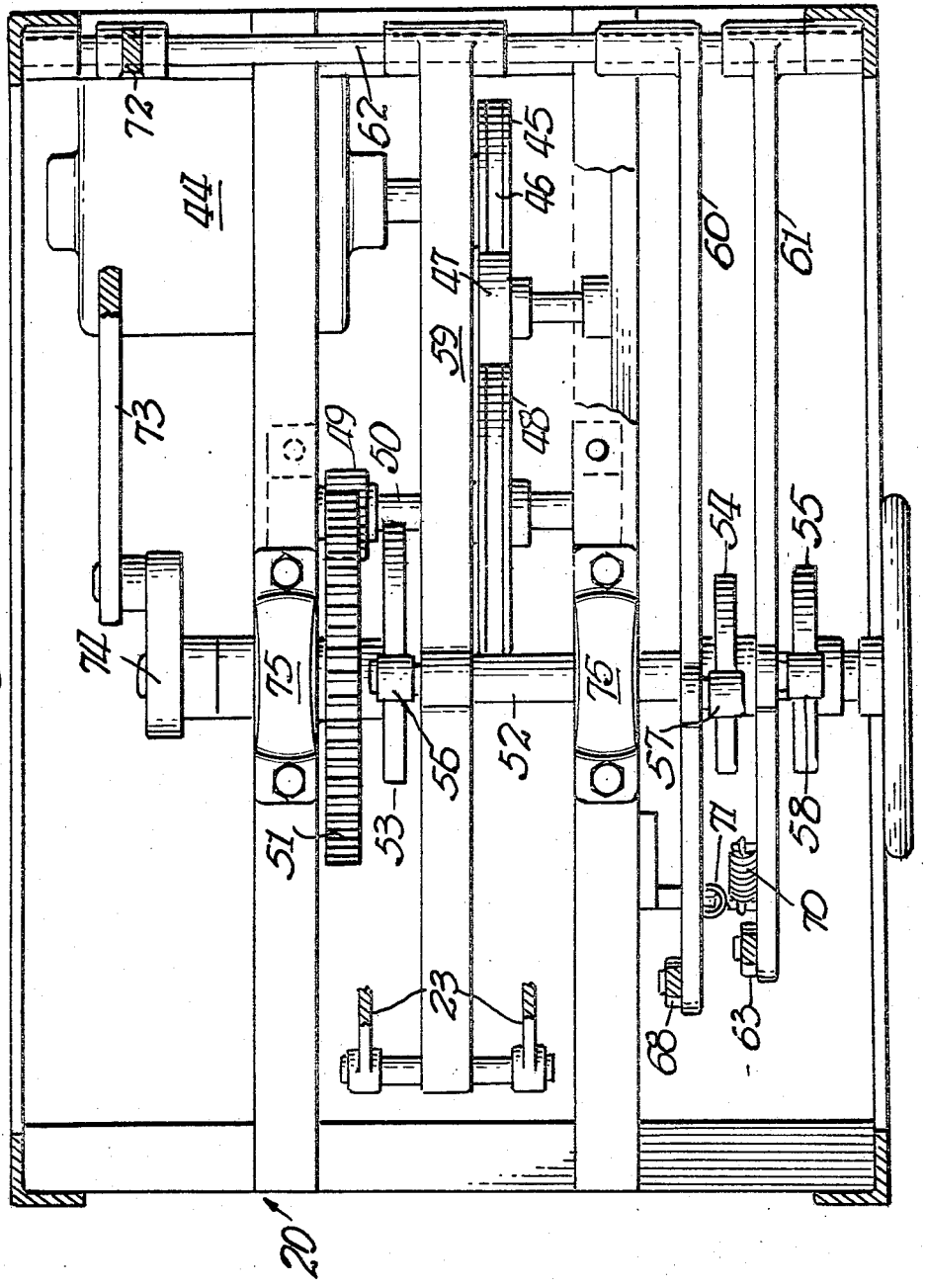
FIG. 14 is a longitudinal horizontal sectional view, taken along the sight line 14—14 of FIG. 12.

On the first face of the stationary crossbar 87 there are provided a plurality of longitudinally spaced buffer blocks 87x (see FIGS. 8, 12 and 15). These blocks are adapted to be edgewise engaged by the central portions x of the partitions to prevent collapse of the partitions when the clinchers 25 move from the position appearing in FIG. 8 to that appearing in FIG. 9. FIG. 9 shows the final setup condition of the carton before it is delivered onto the fingers 98x (by means of the fishtail ejectors 40).

While in the foregoing specification a detailed description of an embodiment of the invention has been set down for the purpose of explanation, many variations in the details herein given may be made by those skilled in the art without departing from the spirit and scope of the invention.

I claim:
1. In egg carton setup apparatus, a frame equipped with a magazine dischargeably supporting a plurality of folded blanks, a shuttle reciprocably mounted on said frame for sequentially receiving blanks from said magazine and moving each blank through a setup path, fork means reciprocably mounted on said frame for movement generally transverse of said path to unfold said blanks, a cell-forming element equipped-setup head rigidly fixed to said frame intermediate said magazine and the intersection of said path with said fork means, pusher means reciprocably mounted on said frame for engaging an unfolded carton developed from said blank and urging the same toward said setup head, clincher means for indenting an unfolded carton in engagement with said setup head, and means on said frame for reciprocating said shuttle, fork means, pusher means and clincher means, said shuttle being equipped with clamping means for immobilizing a carton thereon during movement through said path until said unfolded carton is engaged by said pusher means.

2. The structure of claim 1 in which said clamping means includes a hook-like lug upstanding from said shuttle for engaging an opening on said blank, and a latch member resiliently mounted on said shuttle for clamping the forward edge of said blank.

3. The structure of claim 2 in which said latch is generally L-shaped, with one leg of the L shape being notched to releasably confine said forward ledge, a spring interconnecting the other leg of said L shape and the underside of said shuttle, said pusher means being L-shaped to engage said forward edge to elevate said carton relative to said shuttle and pivot said latch out of engagement with said forward edge.

4. The structure of claim 1 in which said reciprocating means includes a transverse shaft rotatably mounted in said frame, cam means operatively associated with said shaft for each of said fork means, pusher means and clincher means, and eccentric means connected to said shaft for reciprocating said shuttle, said cam means and eccentric means being so related as to actuate said fork means, pusher means and clincher means in sequence following the completion of the shuttle movement away from said magazine.

5. The structure of claim 4 in which said eccentric means includes a shuttle bar mounted for arcuate movement over a substantial arc in a plane parallel to the path of travel of said shuttle and pivotally connected between said shuttle and shaft.

6. Egg carton setup apparatus, comprising a frame, means for advancing successive carton blanks in flat, collapsed condition into a setup zone, a setup head rigidly mounted on said frame above the path of movement of the collapsed blank, clamp means mounted on said advancing means for confining the forward edge of said blank during advancement and retraction thereof until the carton-forming blank is adjacent said setup head, and pusher means for disengaging the carton blank from said clamp means for engagement with said setup head.

References Cited by the Examiner

UNITED STATES PATENTS

| | | | |
|---|---|---|---|
| 2,062,465 | 12/1936 | Lutz | 271—54 |
| 2,700,922 | 2/1955 | Jordan | 93—37 |
| 3,141,391 | 7/1964 | Coleman | 93—37 |

BERNARD STICKNEY, *Primary Examiner.*